Sept. 8, 1953  J. W. ORENDORFF  2,651,426
VEGETABLE CART
Original Filed Dec. 22, 1945  3 Sheets-Sheet 3
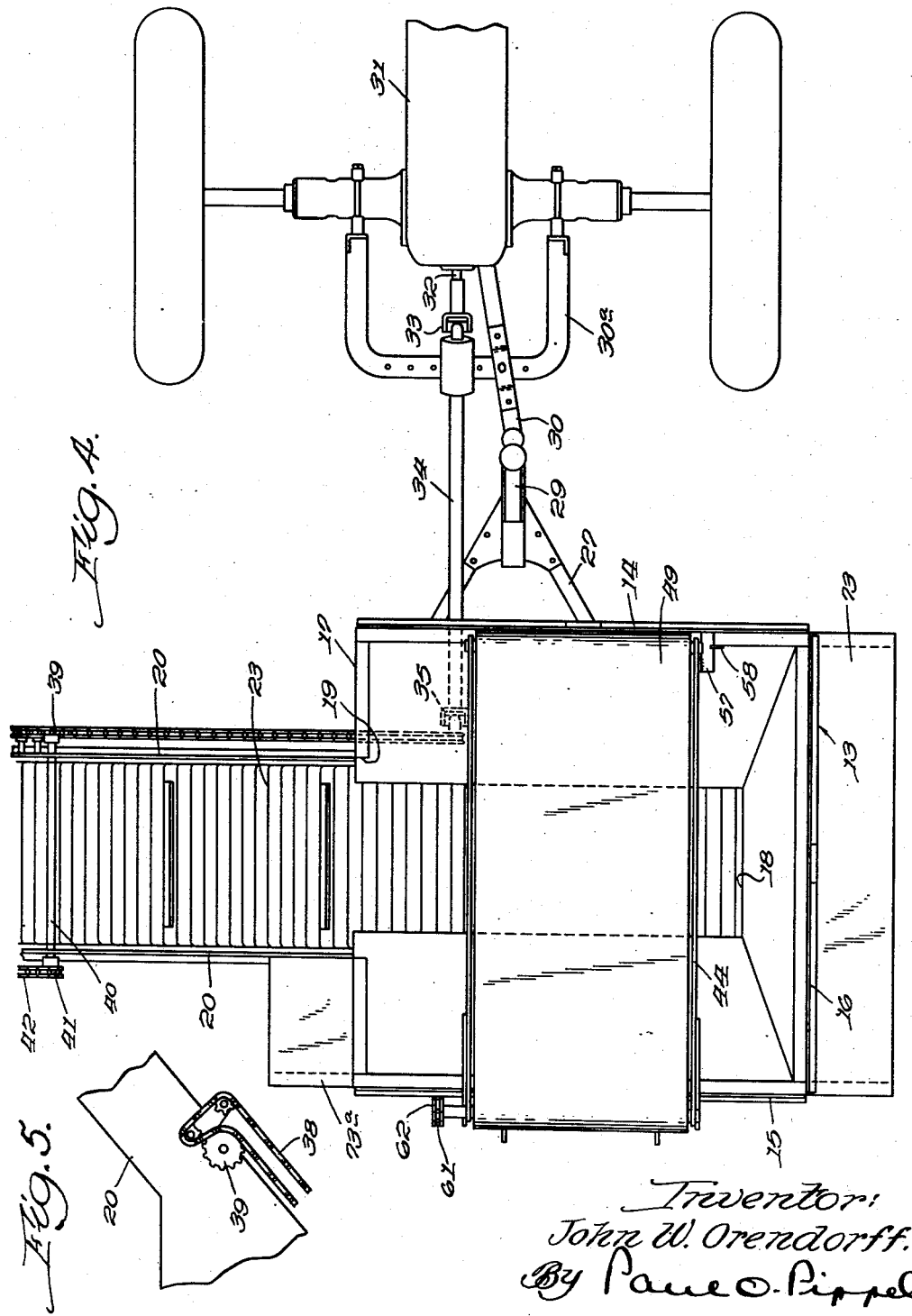
Inventor:
John W. Orendorff.
By Paul O. Pippel
Atty.

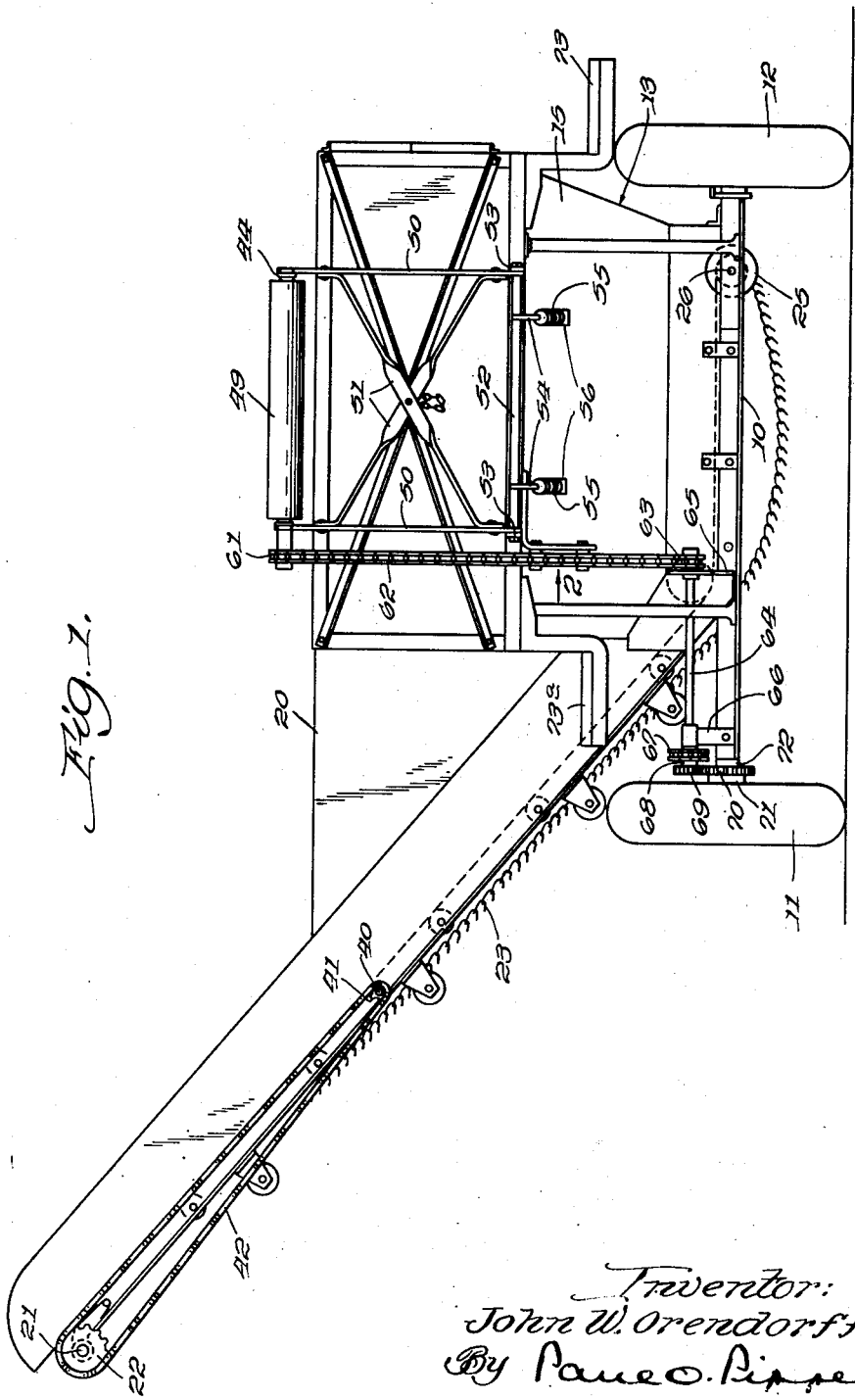

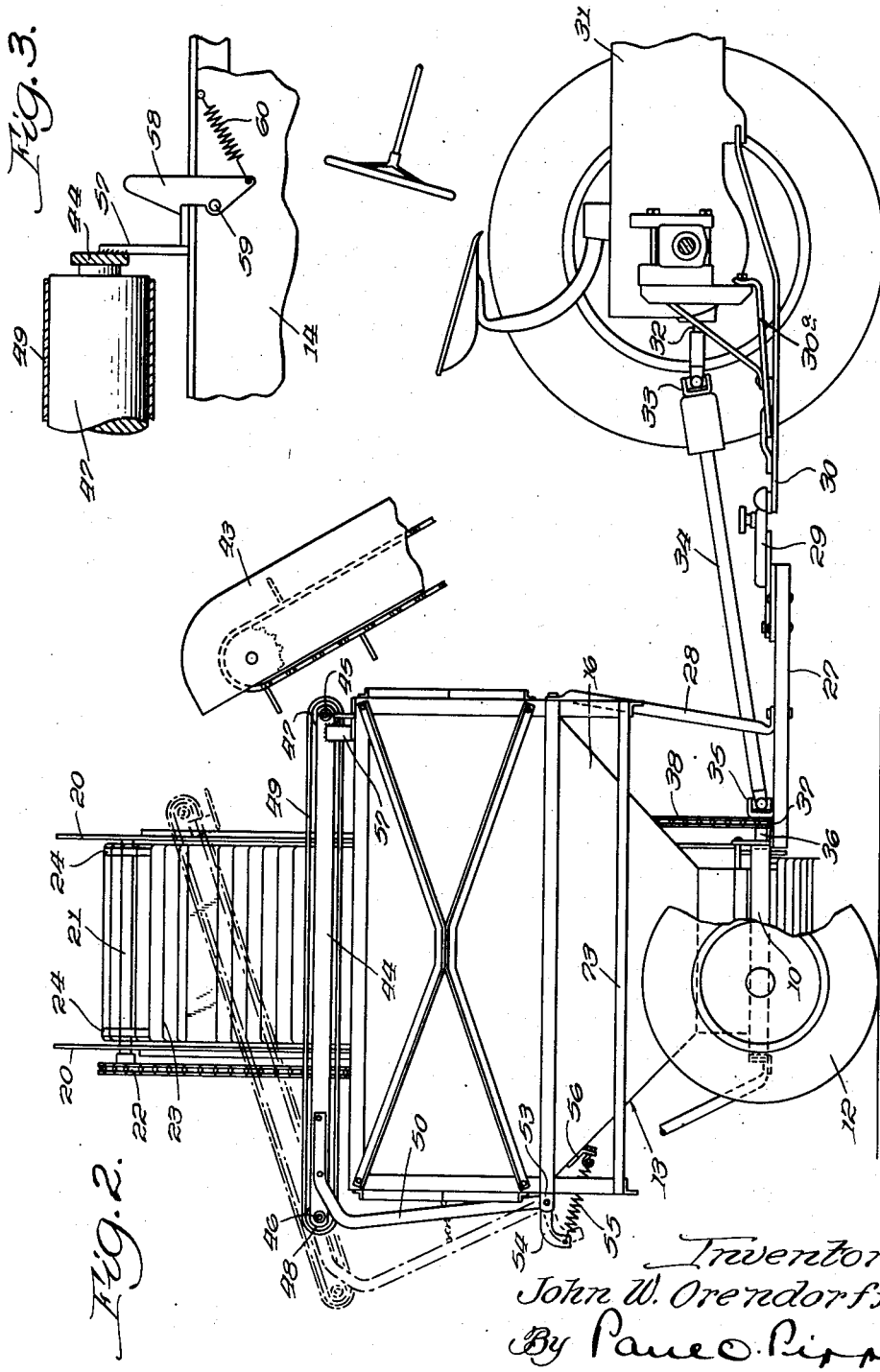

Patented Sept. 8, 1953

2,651,426

UNITED STATES PATENT OFFICE 2,651,426

VEGETABLE CART

John W. Orendorff, Canton, Ill., assignor to International Harvester Company, a corporation of New Jersey Continuation of abandoned application Serial No. 637,029, December 22, 1945. This application July 6, 1951, Serial No. 235,550

17 Claims. (Cl. 214—355)

This invention relates to agricultural implements and particularly to a vegetable cart and loader. This application is a continuation of U. S. application Serial No. 637,029, filed December 22, 1945, and now abandoned.

The invention is of particular importance in its application to the harvesting of crops, such as beets and the like, and is adapted to be drawn behind a harvesting machine as a part thereof to receive beets and the like gathered by the harvesting machinery. A harvesting machine with which the unloading cart of the present invention finds utility is shown and described in pending United States application Serial No. 587,271, filed April 9, 1945, now Patent No. 2,624,997, which includes a rotary knife for severing the tops of beets and the like projecting above the ground, digging blades for loosening and removing the beets from beneath the surface of the ground, a shawing mechanism for loosening dirt adhering to the beets, and an elevating conveyor arranged rearwardly of the digger and shaker to receive the beets and elevate them to a position for discharge upon the ground or into a receptacle. The vegetable cart and loader of this invention is also shown in U. S. application Serial No. 691,188, filed August 17, 1946.

As frequently happens in beet fields where such harvesting machinery is utilized varying soil conditions are encountered. For example, in the passage of a beet harvester across a field of mature beets, the soil may vary from wet to comparatively dry. When harvesting beets in comparatively dry soil, the dirt clinging thereto, by the time it has passed over the shakers and reached the discharge point upon the elevating conveyor, has been dislodged from the beets. Therefore the beets discharged into the receptacle, which is located rearwardly and below the overhanging end of the elevating conveyor, are received in a condition in which the percentage of foreign matter clinging thereto is at a minimum. However, should the digger blades encounter damp soil, the beets removed therefrom have a high percentage of dirt clinging thereto which is not entirely removed by the shaking mechanism and by passage over the elevating conveyor. It is, of course, important that the beets be as clean as possible when they are delivered to the conveyor. It is also of no little importance that the dirt be replaced to avoid depletion of the soil from which it was removed.

An object of the invention is to provide means for removing dirt adhering to the beets and return it to the soil.

Another object of the present invention is to provide an improved cart adapted to be drawn behind a vegetable harvester or the like to receive the crops removed thereby.

Another object of the present invention is to provide a vegetable cart having side walls and an open top to receive beets or the like discharged from the overhanging elevator of a harvesting machine, and an endless conveyor belt pivotally connected to the cart at one side thereof and swingable into and out of position to receive the beets discharged from the elevator so that dirt clinging to the beets received thereupon can be removed prior to placing the beets in the cart.

A further object of the invention is to provide in a vegetable cart such as described a sorting conveyor belt pivotally mounted upon one wall of the receptacle and adapted to span the opening therein in the path of beets or the like to be discharged therein, the pivotal mounting of the belt being such that it may be swung out of operative position easily without danger of engaging the elevator or other working parts.

Other objects and advantages of the invention will become clear from the following detailed description when read in conjunction with the annexed drawings, wherein:

Figure 1 is an end elevation of a beet cart embodying the features of the present invention;

Figure 2 shows a side elevation of the rear end of the tractor with parts removed for clarity and showing the beet cart of the present invention connected thereto;

Figure 3 is an enlarged detail partly in section showing the latching mechanism for releasably holding the sorting belt in operating position;

Figure 4 is a plan view of the cart shown in Figures 1 and 3; and

Figure 5 is a detail showing a portion of the driving mechanism for the unloading elevator forming a part of the cart structure.

Referring to the drawings, the wheel supported cart of the present invention includes a rectangular frame 10 supported at opposite ends by ground wheels 11 and 12, a receptacle 13 having vertically extending front and rear walls 14 and 15 and side walls 16 and 17. Side walls 14, 15, and 16 are provided with inwardly inclined lower portions terminating in spaced relation to provide an opening 18 in the bottom of the receptacle. The rear wall 17 of the receptacle is provided with an opening 19 to the opposite sides of which are secured rearward extensions 20. The extensions 20 extend rearwardly and upwardly and a transverse shaft 21 is mounted therebelow adjacent the upper end thereof, one end of the shaft projecting outwardly and being provided with a sprocket wheel 22.

Extensions 20 of the rear wall 17 provide a guideway for an endless conveyor chain 23 trained about wheels 24 laterally spaced on shaft 21 at one end and extending downwardly and under the receptacle beneath the opening 18 in the bottom thereof, the other end of the chain 23 being trained about wheels 25 mounted upon a shaft 26 journaled in the opposite sides of frame 10. The lower end of this chain forms a bottom for the receptacle and allows the passage of foreign matter therethrough. The chain 23 is driven by conventional mechanism now to be described.

Secured to the forward side of the frame 10 is a triangular draw frame 27 braced by a strap 28 secured to the draw frame and to the receptacle 13. At the forwardly extending apex of the triangular draw frame 27 there is provided a coupling 29 of conventional form for pivotal attachment to an auxiliary adjustable draw-bar 30 connected to a tractor 31. Auxiliary draw-bar 30 is adjustably secured to a U-shaped draw-bar 30ª attached to the tractor.

A conventional power take-off shaft 32 is connected by a universal coupling 33 to a shaft 34 connected by a universal joint 35 to a shaft 36 mounted upon the frame 10 and carrying a sprocket wheel 37 drivingly connected by a chain 38 to a sprocket 39 mounted upon a shaft 40 carried by extensions 20. Upon the opposite end of shaft 40 is secured a sprocket 41 connected by a chain 42 to the sprocket 22 on shaft 21. The endless conveyor 23 is thus driven from the power take-off shaft of the tractor. Figure 5 shows the manner in which the drive chain 38 engages the sprocket wheel 39 through the use of idler gears in order to drive the sprocket 39 in a direction opposite to the direction of rotation of the sprocket 37.

As pointed out before, the cart of the present invention is particularly adapted for use with vegetable harvesters, such as the beet harvester shown and described in pending United States application Serial No. 587,271, filed April 9, 1945. Figure 2 of the drawings shows the upper end of the rearwardly and upwardly extending elevating conveyor 43, only the upper end of which is shown and the connection of which to the tractor is eliminated for the sake of clarity. Figure 2 shows the position the elevator occupies with respect to the beet cart so that beets discharged from the elevator are discharged into the receptacle and are guided along the inwardly inclined lower portions of the side walls thereof and deposited upon the chain conveyor 23. In actual practice the receptacle is filled with beets as it travels across a field and the conveyor chain 23 is not operated until the end of a row is reached. Operation of the conveyor 23 then functions to unload the beets from the beet cart and convey them to other receptacles. In passing through normally relatively dry soil conditions, the beets which have been discharged by the elevator 43 into the beet cart are relatively free from dirt adhering thereto. However, when passing through moist soil conditions the dislodging of dirt clinging to the beets is more difficult and provision has been made to prevent the collection of large amounts of dirt in the cart prior to unloading the beets therefrom. This has been accomplished by a mechanism now to be described.

Mounted upon a frame member 44 and at opposite ends thereof are spaced shafts 45 and 46 upon which are mounted rollers 47 and 48 serving for the reception of an endless belt 49. Frame 44 is provided with an extension piece in the form of a pair of laterally spaced straps 50 which extend approximately at right angles away from one end of the frame 44, as clearly shown in Figure 2 and are braced by cross bars 51. The lower ends of the straps 50 are secured to a shaft 52, the ends of which are pivotally mounted in lugs 53 affixed to the rear wall 15 of the receptacle. Likewise secured to the shaft 52, as by welding, are rearwardly and downwardly curved arms 54, to the end of each of which is connected one end of a spring 55, the other end of which is anchored to a lug 56 affixed to the inwardly inclined lower portion of the wall 15.

The conveyor belt 49 mounted upon the frame 44 is narrower in width than the top opening in the receptacle. The belt 49 spans this opening from front to rear thereof and the entire assembly is pivotable about the shaft 52 as an axis so that the belt can be swung outwardly in the manner indicated in dotted lines in Figure 2. The forward end of the frame 44 on one side thereof is provided with a downwardly extending L-shaped foot 57, the lower portion of which, when the belt is in the operating position shown in Figure 3, is engaged by a latch 58 pivoted at 59 upon the forward wall 14 of the receptacle. The lower end of the latch 58 is connected by a spring 60 with the wall of the receptacle, the spring biasing the latch to a position in latching engagement with the L-shaped foot 57 (see Figure 3).

When the belt 49 spans the opening in the top of the receptacle, it is in position to receive for sorting beets discharged by gravity from the elevator 43. Since the forward end of the sorting conveyor lies directly under the upper end of the elevator 43, the belt assembly has been caused to pivot about a point below its rear end so that the belt is swung in a long arc away from the elevator 43 when it is desired to move it to an inoperative position.

The conveyer belt 49 is driven by means which include a sprocket wheel 61 mounted upon the end of shaft 46 projecting beyond the sides of the frame 44, sprocket 61 being drivingly connected by a chain 62 with another sprocket 63 mounted upon a counter-shaft 64, one end of which is rotatably mounted in bearings in a bracket 65 secured to the frame 10 and the other end of which is rotatably mounted in bearings in a bracket 66 also secured to the frame 10 adjacent the supporting wheel 11. The end of shaft 64 projecting beyond bracket 66 is drivingly connected by a chain 67 to a shaft 68 upon which is mounted a gear 69 which meshes with a gear 70 mounted upon a sleeve 71 carried by a spindle 72 by which wheel 11 is secured to the frame 10. Thus belt 49 is driven from the ground-engaging wheel 11.

Beets discharged upon the belt 49 are carried therealong and sorted by operators standing upon platforms 73 and 73ª, platform 73 extending the length of one side 16 of the receptacle and platform 73ª being provided in the angle between the side wall 17 and its extension 20. The operators are thus in position to remove dirt clinging to the beets prior to dropping the beets into the receptacle. Dirt removed from the beets is carried along by the conveyer belt 49 and discharged from the rear end thereof. The dirt is thus returned to the soil in approximately the location from which it was withdrawn. When the beet cart is again passing through comparatively dry soil so that sorting becomes unnecessary, the latch 58 holding the belt assembly in operating position is released and springs 55 urge the belt assembly to swing outwardly away from the receptacle and to an inoperative position where the discharge of beets into the receptacle is not interfered with.

The novel beet cart of the present invention provides sorting mechanism for the beets when the harvester mechanism with which the cart is operated encounters damp soil conditions and also provides an unloading elevator for transferring the harvested beets to other receptacles for transport.

It is believed that the operation of the cart of the present invention will be fully understood from the foregoing description. Having described the invention it may, of course, be understood that modifications may be made therein without departing from the spirit of the invention or the scope of the appended claims.

What is claimed is:

1. A receptacle adapted to receive harvested vegetables discharged by gravity from a delivery device comprising a bottom and side walls and an opening in the top thereof to receive the vegetables, and a conveyor associated with the receptacle and optionally movable to and from a position over the opening in the receptacle in the path of the vegetables discharged from the delivery device to receive the vegetables and prevent the entry thereof directly into the receptacle.

2. The combination with a receptacle arranged to receive harvested vegetables discharged by gravity from a delivery device thereabove, of conveyor means mounted on the receptacle and optionally movable as a unit into a position between the delivery device and the opening in the receptacle to intercept and receive by gravity the material that would normally fall directly into the receptacle, said conveyor means extending to a location beyond the receptacle for the discharge of the material therefrom.

3. The combination with a delivery device and a receptacle arranged below the delivery device to receive material discharged by gravity therefrom, of conveyor means associated with the receptacle movable bodily into and out of a position between the delivery device and the opening in the receptacle to intercept and receive by gravity material that would normally fall directly into the receptacle and alternatively deliver it to a location beyond the receptacle.

4. The combination with a receptacle provided with an opening arranged to receive material discharged from a delivery conveyor, of a second conveyor spanning the opening in said receptacle in a location to receive thereupon material discharged from said delivery conveyor, and means for mounting said second conveyor on the receptacle for optional movement in a substantially fixed path between positions in and out of the path of the discharged material, whereby, if desired, the material may be discharged directly into the receptacle.

5. The combination with a receptacle provided with an opening arranged to receive material discharged from a delivery device, of a conveyor mounted on the receptacle for optional movement as a unit in a substantially fixed path into a position between the delivery device and the opening in the receptacle in the path of the material discharged from the delivery device to receive thereon the material that would normally fall directly into the receptacle, said conveyor extending to a location beyond the receptacle for the discharge of the material thereon.

6. The combination with a receptacle provided with an opening arranged to receive material discharged from a delivery conveyor, of an endless sorting belt assembly spanning the opening in said receptacle in a location to receive thereupon material discharged from said delivery conveyer, and means for mounting said belt assembly on the receptacle for optional movement in a substantially fixed path between positions in and out of the path of the discharged material, whereby, if desired, the material may be discharged directly into the receptacle.

7. In combination with a delivery conveyer extending upwardly and discharging material from the upper end thereof, a receptacle associated with the conveyer arranged to receive material discharged from the upper end of the conveyer, a horizontal endless sorting belt assembly extending over the opening in said receptacle with one end thereof adjacent the discharge end of the conveyer in a location to receive material discharged therefrom, and pivot means connecting the end of said belt assembly remote from the conveyer to said receptacle for swinging movement of the belt assembly away from the opening in the receptacle.

8. A vegetable cart adapted to receive crops discharged from a location thereabove, comprising a wheel-supported frame, a receptacle on the frame having vertically extending side walls, an endless conveyer forming the bottom of said receptacle and extending upwardly and outwardly therefrom for the unloading of crops from the receptacle, and an endless sorting belt pivotally supported at one end on one side wall of the receptacle and extending over the opening therein to the opposite side wall in the path of crops discharged therein, said sorting belt being swingable about its pivot into and out of the path of the discharged crops.

9. A vegetable cart adapted for attachment to a harvesting machine to receive crops discharged therefrom, comprising a frame, ground wheels supporting the frame, a receptacle on the frame having vertically extending side walls, an endless conveyer forming the bottom of said receptacle and extending upwardly and outwardly therefrom for the unloading of crops from the receptacle, means deriving power from the harvesting machine for driving said unloading conveyer, and an endless sorting belt pivotally supported at one end on one side wall of the receptacle and extending over the opening therein to the opposite side wall in the path of crops discharged therein, said sorting belt being swingable about its pivot into and out of the path of the discharged crops.

10. A vegetable cart adapted for attachment to a harvesting machine to receive crops discharged therefrom, comprising a frame, ground wheels supporting the frame, a receptacle on the frame having vertically extending side walls, an endless conveyer forming the bottom of said receptacle and extending upwardly and outwardly therefrom for the unloading of crops from the receptacle, means deriving power from the harvesting machine for driving said unloading conveyer, an endless sorting belt pivotally supported at one end on one side wall of the receptacle and extending over the opening therein to the opposite side wall in the path of crops discharged therein, said sorting belt being swingable about its pivot into and out of the path of the discharged crops, and means for driving the sorting belt from one of said ground wheels.

11. In a vehicle adapted to be propelled over the ground, a frame, wheels supporting the frame, a receptacle carried by the frame for the reception of material discharged from a source located thereabove, an endless belt assembly arranged to substantially span the opening in said receptacle in the path of the discharged material, pivot means connecting the belt assembly to the receptacle at a location spaced vertically below the belt, whereby the belt assembly may be swung bodily out of the path of the material discharged into the receptacle, and means for driving the belt from one of said wheels.

12. A cart adapted to be used with a delivery conveyor to receive material discharged therefrom comprising a frame, wheels supporting the frame, a receptacle carried by the frame arranged to receive material discharged by gravity from the conveyor, an endless sorting belt assembly spanning the opening in said receptacle in a location to receive thereupon material discharged from said delivery conveyor, and means pivotally mounting said belt assembly on the receptacle for swinging movement about a horizontal axis vertically removed from one end of the belt assembly.

13. A cart adapted to be used with a delivery conveyor to receive material discharged therefrom comprising a frame, wheels supporting the frame, a receptacle carried by the frame having vertically extending side walls defining an opening in the top arranged to receive material discharged from the conveyor, an L-shaped member having one leg thereof extending vertically parallel to one of said side walls, an endless sorting belt mounted on the other leg of the member and spanning the opening in said receptacle, and pivot means connecting the lower end of said vertical leg to the receptacle, whereby the sorting belt may be swung out of the path of the discharged material.

14. A cart adapted to be used with a delivery conveyor to receive material discharged therefrom comprising a frame, wheels supporting the frame, a receptacle carried by the frame having vertically extending side walls and an opening in the top arranged to receive material discharged from the conveyor, an endless sorting belt spanning the opening in the receptacle in the path of material discharged from the conveyor, means pivotally mounting the belt on the receptacle for swinging movement about a horizontal axis spaced vertically below said belt, whereby translational movement is imparted to the belt upon swinging the latter out of operative position in the path of the discharged material, releasable latching means retaining the belt in operative position, and a spring biasing the belt to inoperative position.

15. A loading cart adapted to receive material deposited therein from above and to discharge the accumulated material therefrom comprising a frame, ground wheels supporting the frame, a receptacle on the frame having side walls, said receptacle having an open top and bottom, an endless conveyer forming a part of the receptacle, said conveyer having a horizontal portion and a portion extending upwardly and outwardly at an angle to the horizontal portion of the conveyer whereby material may be retained in the receptacle, means for driving the conveyer to unload the accumulated material therefrom, a second horizontal endless conveyer carried by the receptacle and extending over the open top thereof in the path of material discharged therein, and means for independently driving said last mentioned conveyer.

16. In a vehicle adapted to be propelled over the ground, a frame, wheels supporting the frame, a receptacle carried by the frame having side walls defining an opening in the top to receive material discharged from a source located thereabove, a horizontally disposed conveyor mounted on the receptacle and extending across the opening thereof in the path of the discharged material, said conveyor being mounted on the receptacle for swinging movement to and from a position out of the path of the discharged material to permit the latter to be discharged directly into the receptacle, means serving as a platform carried by the vehicle adapted to accommodate an operator, whereby the material discharged upon the conveyor may be manually sorted and the selected material deposited in the receptacle, and means for driving the conveyor to discharge the material remaining thereon.

17. A vegetable cart for attachment to a machine for harvesting beets or the like to receive the beets discharged therefrom comprising a frame, ground wheels supporting the frame, a rectangular receptacle carried by the frame having vertically extending side walls defining an opening in the top to receive beets discharged from a source located thereabove, an endless conveyor belt extending between opposite walls over the opening in said receptacle in the path of beets discharged therein, said belt having a substantially unbroken surface and being of less width than the receptacle opening to provide open spaces between the conveyor and opposite side walls, said walls including downwardly converging lower portions, an elevator forming a part of the bottom and one wall for unloading beets from the receptacle, means for driving the conveyor belt from the ground wheels, platforms carried by the receptacle at opposite sides of the conveyor belt to accommodate operators, whereby the beets may be manually separated from the waste material and dropped into the receptacle through the open spaces at the sides of the belt while the waste material is discharged from the cart by the conveyor belt, and a power connection between the machine and the elevator and under control of the machine operator for unloading beets from the receptacle.

JOHN W. ORENDORFF.

References Cited in the file of this patent

UNITED STATES PATENTS

| Number | Name | Date |
|---|---|---|
| 1,142,197 | Murphy | June 8, 1915 |
| 1,289,169 | Henderson | Dec. 31, 1918 |
| 1,308,935 | Cook | July 8, 1919 |
| 1,615,334 | MacGregor | Jan. 25, 1927 |
| 1,736,584 | Diago | Nov. 19, 1929 |
| 2,379,198 | Templeton | June 26, 1945 |
| 2,404,629 | Griff | July 23, 1946 |
| 2,447,399 | Dey | Aug. 17, 1948 |
| 2,472,582 | Green | June 7, 1949 |